Nov. 12, 1957  C. E. McCOY  2,812,674
SHEAR PIN PROTECTED TAIL PIPE HOLDER FOR ROD MILLS
Filed Nov. 30, 1954
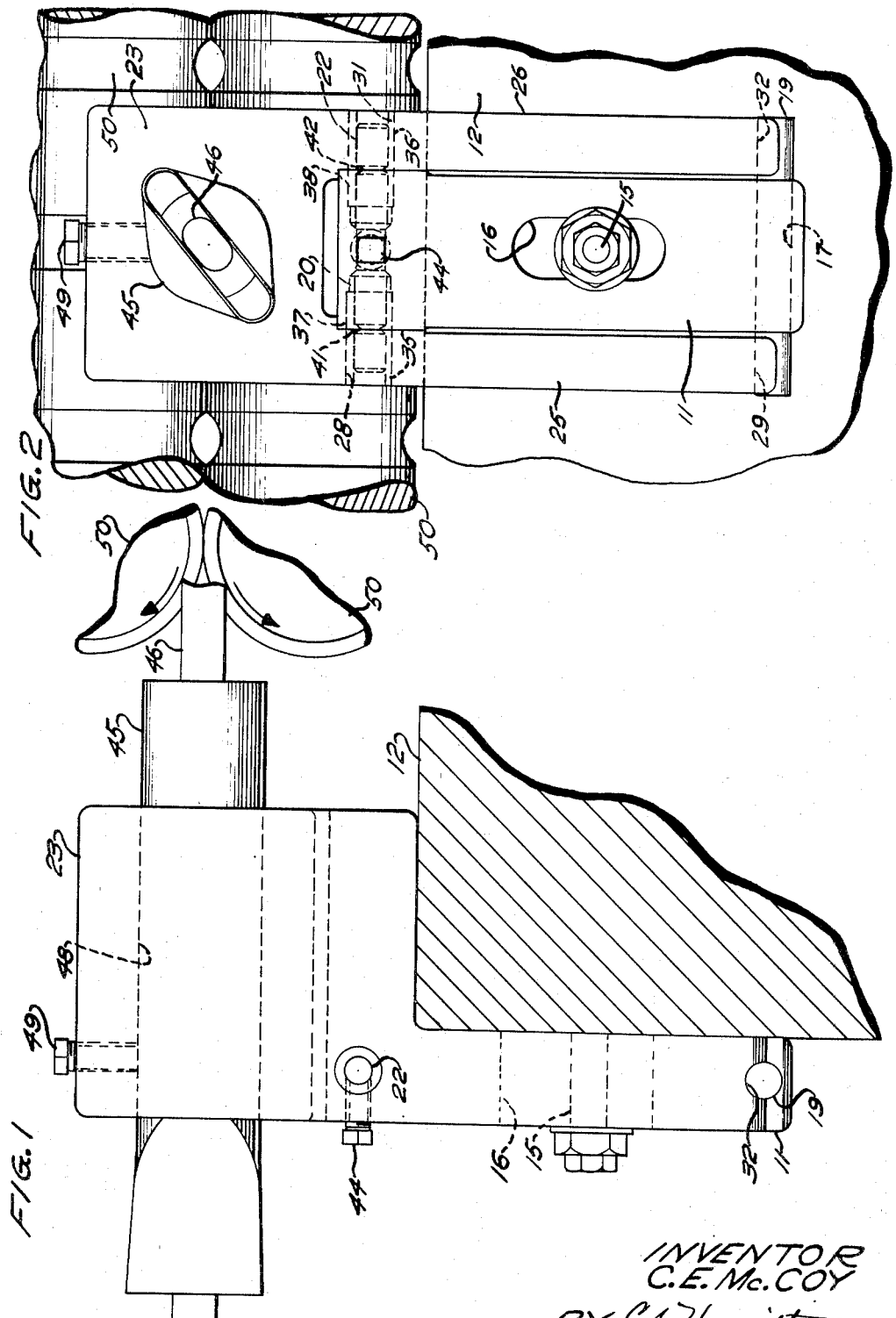
INVENTOR
C. E. Mc.COY
BY C. B. Hamilton
ATTORNEY

United States Patent Office 2,812,674
Patented Nov. 12, 1957

2,812,674

SHEAR PIN PROTECTED TAIL PIPE HOLDER FOR ROD MILLS

Clarence E. McCoy, Clarendon Hills, Ill., assignor to Western Electric Company, Incorporated, New York, N. Y., a corporation of New York Application November 30, 1954, Serial No. 472,018

7 Claims. (Cl. 80—51)

This invention relates to material guiding apparatus and more particularly to a damage-proof protected device for guiding rod stock in a rolling mill.

An object of this invention is to provide an improved rod rolling mill tail pipe holder which is protected from damage caused by rod jams in the tail pipe.

Another object of this invention is to provide an improved rod rolling mill tail pipe holder which may be sheared from its support wtihout damage by rod jamming and may be rapidly and accurately repositioned on its stationary support in alignment with the roll grooves.

One embodiment of the present invention for guiding rod stock in a rod rolling mill may include a fixed bracket, and a rod guiding member held on the bracket in alignment with cooperating grooves in a pair of forming rolls by a shear pin, whereby, if the rod jams in the guiding member, the pin is sheared to avoid destruction of the guiding member. After the jammed rod is removed from the guiding member the guiding member is repositioned on the fixed bracket and a new shear pin is inserted therein, the guiding member being automatically realigned with the grooves in the forming rolls as it is repositioned on the bracket.

Other objects and advantages of the invention will become apparent by reference to the following detailed description thereof and the accompanying drawings illustrating one embodiment of the invention, in which Fig. 1 is a side elevation of the shear pin equipped tail pipe holder, and, Fig. 2 is a front elevation thereof.

Referring now in detail to the drawings an inverted L-shaped bracket 11 is shown supported on a shoulder 12 of a base of a rod rolling mill housing and fastened thereto by a bolt 15 passing through a slot 16 in the bracket 11 and threaded into the shoulder 12. This bracket 11 has a lower horizontal bore 17 through which extends a pin 19, and an upper horizontal bore 20 for receiving a shear pin 22. A bifurcated block 23 having depending legs 25 and 26 is supported by the bracket 11, the legs 25 having a horizontal bore 28 and an arcuate recess 29 in its lower end and the leg 26 having a horizontal bore 31 and an arcuate recess 32 in its lower end, whereby the depending legs 25 and 26 extend down opposite sides of the bracket 11, the bores 20, 28 and 31 being in alignment and the projecting ends of the pin 19 being positioned in the arcuate recesses 29 and 32 in the legs 25 and 26.

Hardened steel bushings 35 and 36 are secured in the horizontal bores 28 and 31 to abut with hardened steel bushings 37 and 38 which are secured in the bore 20 in the bracket 11 (Fig. 2). A shear pin 22 having circumferential re-entrant grooves 41 and 42 is positioned in the bushings 35, 36, 37 and 38 with the grooves 41 and 42 in alignment with the abutting ends of the bushings. A set screw 44 is threaded through the bracket 11 to maintain the shear pin 22 in the proper position.

A rod mill tail pipe 45 having one end formed into a rectangular shape for guiding a moving rod 46 is held in a horizontal hole 48 in the block 23 by a set screw 49.

In operation the rod 46 is fed by a pair of grooved rolls 50 through the tail pipe 45, the tail pipe serving as a guide. As the hot rolled rod 46 travels through the tail pipe 45 metal scale from the rolled rod is deposited therein, accumulations of which impede the progress of the rod through the tail pipe 45 to jam the rod in the tail pipe. When the rod 46 is jammed in the tail pipe 45 the block 23 is forced to the left (Fig. 1) to shear the pin 22 at the grooves 41 and 42, the bushings 35, 36, 37 and 38 being hardened to shear the pin without damage to the bracket 11 or the block 23. When the pin 22 is sheared the block 23 is pushed to the left, pivoting about the pin 19 until the legs 25 and 26 clear the pin 19 and is carried by the moving rod 46 until the operator stops the rolls 50. Thus, the block 23 and the bracket 11 are not destroyed but only a pin is sheared when the rod jams in the tail pipe. After the jammed rod 46 has been removed from the tail pipe 45 the block 23 is repositioned on the bracket 11 and another shear pin 22 is inserted therein, the tail pipe 45 being automatically realigned with the grooves in the rolls 50 as the block 23 is placed on the bracket 11.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for guiding moving material comprising an apertured bracket, means for rigidly holding the bracket, a block positioned on the bracket, said block having apertured depending portions on opposite sides of the bracket, material guiding means secured to the block, and a pin passing through the aligned apertures in the bracket and depending portions of the block to secure the block to the bracket and adapted to be sheared when a jam of material occurs in the guiding means secured to the block.

2. A device for guiding material comprising a block having a slotted apertured lower portion, means secured to the block for guiding material, a bracket having an apertured upper portion positioned in the slot in the lower portion of the block, a shear pin secured in the aligned apertures in the block and bracket for securing the block to the bracket, and means for supporting the bracket.

3. An apparatus for guiding strip stock comprising a bracket having an apertured upper portion, means for supporting the bracket, a block having a recessed lower portion for receiving the upper portion of the bracket, said lower portion of the block having an aperture in alignment with the aperture in the upper portion of the bracket, material guiding means secured to the block, and a shear pin passing through the aligned apertures in the bracket and the block for securing the block to the bracket.

4. An apparatus for guiding strip stock comprising a block having apertured depending legs, the lower end of each said leg being arcuately recessed, a tube secured to the block for guiding strip stock, an apertured bracket for supporting the block, said bracket having projecting lugs which are positioned in the arcuate recesses in the lower ends of the depending legs, a shear pin secured in the aligned apertures in the depending legs and the bracket to secure the block to the bracket and adapted to be sheared to permit the block to separate from the bracket when a jam of strip stock occurs in the tube secured to the block, and means for supporting the bracket.

5. A device for guiding a rod from forming grooves in a rod rolling mill comprising a bifurcated block having apertures in the bifurcated portion, a tail pipe for guiding the rod and secured to the block in alignment with the said pair of cooperating grooves in forming rolls, an apertured bracket positioned in the bifurcated portion of the block for holding the tail pipe in alignment with the said grooves, a pin passing through the aligned apertures and the bracket and the block to secure the block to the bracket and adapted to be sheared when a rod jam occurs in the tail pipe to permit the block to separate from the bracket without damage thereto, and means for supporting the bracket in a predetermined aligned position with the said grooves.

6. A device for guiding a rod from rolls of a rolling mill, which comprises a fixed bracket, a tail pipe, a holder mounted pivotally on the bracket for holding the tail pipe in alignment with the rolls, and a shear pin normally locking the holder to the bracket in a position holding the tail pipe in alignment with the rolls.

7. A device for guiding a rod from forming grooves in a rod rolling mill comprising a block, a tail pipe secured to the block for guiding the rod, an apertured bracket for supporting the block, means for supporting the bracket in adjusted position, said block having apertured portions depending on opposite sides of the bracket, and a shear pin passing through the apertures in the bracket and the depending portions of the block to secure the block to the bracket, said shear pin being notched whereby when a rod jam occurs in the tail pipe the pin is sheared at predetermined points without burring to permit the block to separate from the bracket without damage thereto, said bracket remaining in adjusted position on the supporting means when the pin is sheared by the rod jam.

References Cited in the file of this patent

UNITED STATES PATENTS

| | | |
|---|---|---|
| 530,591 | Kilmer | Dec. 11, 1894 |
| 966,556 | Jewell | Aug. 9, 1910 |
| 1,881,869 | Nelson | Oct. 11, 1932 |
| 2,698,528 | Boesch | Jan. 4, 1955 |